(12) United States Patent
Wilke et al.

(10) Patent No.: US 11,987,718 B2
(45) Date of Patent: May 21, 2024

(54) COATING COMPOSITION FOR PRODUCING A LAYER COMPOSITE

(71) Applicant: Mitsubishi HiTec Paper Europe GmbH, Bielefeld (DE)

(72) Inventors: Nora Wilke, Flensburg (DE); Martin Schreer, Melle (DE)

(73) Assignee: MITSUBISHI HITEC PAPER EUROPE GMBH, Bielefeld (DE)

( * ) Notice: Subject to any disclaimer, the term of this patent is extended or adjusted under 35 U.S.C. 154(b) by 618 days.

(21) Appl. No.: 16/613,734

(22) PCT Filed: May 18, 2018

(86) PCT No.: PCT/EP2018/063065
§ 371 (c)(1),
(2) Date: Dec. 11, 2019

(87) PCT Pub. No.: WO2018/211063
PCT Pub. Date: Nov. 22, 2018

(65) Prior Publication Data
US 2020/0354602 A1    Nov. 12, 2020

(30) Foreign Application Priority Data

May 19, 2017   (DE) .................... 10 2017 111 022.4
Nov. 23, 2017   (DE) .................... 10 2017 127 680.7

(51) Int. Cl.
| | | |
|---|---|---|
| C09D 129/04 | (2006.01) | |
| B41M 5/337 | (2006.01) | |
| B41M 5/44 | (2006.01) | |
| C08K 3/013 | (2018.01) | |
| C08K 3/34 | (2006.01) | |
| C08K 3/36 | (2006.01) | |
| C08K 5/00 | (2006.01) | |
| C09D 123/08 | (2006.01) | |
| C09D 133/02 | (2006.01) | |

(52) U.S. Cl.
CPC ......... *C09D 129/04* (2013.01); *B41M 5/3372* (2013.01); *B41M 5/44* (2013.01); *C08K 3/013* (2018.01); *C08K 3/346* (2013.01); *C08K 3/36* (2013.01); *C08K 5/0025* (2013.01); *C09D 123/08* (2013.01); *C09D 133/02* (2013.01)

(58) Field of Classification Search
None
See application file for complete search history.

(56) References Cited

U.S. PATENT DOCUMENTS

| | | | | |
|---|---|---|---|---|
| 4,247,595 A | * | 1/1981 | Nomura ................ | B41M 5/30 427/151 |
| 2005/0181945 A1 | * | 8/2005 | Takagi ................ | B41M 5/40 503/226 |
| 2006/0111488 A1 | | 5/2006 | Zhang et al. | |
| 2012/0100340 A1 | | 4/2012 | Valera et al. | |
| 2014/0005046 A1 | * | 1/2014 | Matsumoto ............ | B41M 5/42 503/207 |
| 2014/0274681 A1 | * | 9/2014 | Behrens ............... | B41M 5/3275 503/209 |

FOREIGN PATENT DOCUMENTS

| | | | |
|---|---|---|---|
| DE | 3207744 | 9/1983 | |
| DE | 3544758 | 7/1986 | |
| DE | 3942692 | 7/1990 | |
| DE | 69302703 | 11/1996 | |
| DE | 69401145 | 4/1997 | |
| DE | 112011100779 | 12/2012 | |
| DE | 112012001184 | 2/2019 | |
| EP | 2489521 | 8/2012 | |
| EP | 3000608 B1 * | 3/2020 | ............ B41M 5/323 |
| JP | 2012091451 A * | 5/2012 | |
| WO | WO97/28091 | 5/1997 | |
| WO | WO-2014181746 A1 * | 11/2014 | ............ B41M 5/323 |
| WO | WO-2014189044 A1 * | 11/2014 | ............ B41M 5/323 |
| WO | WO-2016158049 A1 * | 10/2016 | ............ B01D 19/00 |

OTHER PUBLICATIONS

Machine translation of WO 2016/158049 A1, retrieved Jul. 2023 (Year: 2023).*
Machine translation of JP2012091451A, retrieved Sep. 2023 (Year: 2023).*
Office Action dated Mar. 24, 2021 issued in European Patent Application No. 18726130.0.
Office Action for the corresponding German Patent Application No. 10 2017 111 022.4.

* cited by examiner

*Primary Examiner* — Nicole M. Buie-Hatcher
(74) *Attorney, Agent, or Firm* — Cozen O'Connor

(57) ABSTRACT

A coating composition for producing a layer composite, including a) a modified or unmodified polyvinyl alcohol, b) an alkylene/(meth)acrylic acid copolymer, c) a crosslinker, and d) one, two or more than two, pigments. The layer composite is used as food packaging, entry ticket, gaming ticket, car park ticket, or the like. A mixture of alkylene/(meth)acrylic acid copolymer and modified or unmodified polyvinyl alcohol is used in a layer of a layer composite, to the use of a coating composition for producing a layer composite.

2 Claims, 1 Drawing Sheet ial—used as flight tickets and entry tickets for example—which are printed in particular by offset printing processes. In this case the heat-sensitive recording material is initially printed in a large number of copies with any unchanging information, for example with company logos, images and text, to create a heat-sensitive blank (e.g., a ticket blank). The heat-sensitive blanks produced are loaded into a thermal printer at the point of sale and can then be individually thermally printed with information before the individualized recording material is handed to the end customer. This information may vary with every printing operation, for example in date, event name, seat number, card number, mass, price, etc.

COATING COMPOSITION FOR PRODUCING A LAYER COMPOSITE

CROSS REFERENCE TO RELATED APPLICATIONS

This is a U.S. national stage of Application No. PCT/EP2018/063065 filed May 18, 2018. Priority is claimed on German Application No. DE 10 2017 111 022.4 filed May 19, 2017 and German Application No. DE 10 2017 127 680.7 filed Nov. 23, 2017 the content of which is incorporated herein by reference.

BACKGROUND OF THE INVENTION

1. Field of the Invention

The present invention relates to a coating composition for producing a layer composite, to a layer composite, to the use of a layer composite as packaging material, especially for food packaging, entry ticket, gaming ticket, car park ticket, or the like, to the use of a mixture of alkylene/(meth)acrylic acid copolymer and modified or unmodified polyvinyl alcohol in a layer of a layer composite, to the use of a coating composition for producing a layer composite, and to a method for producing a layer composite.

2. Description of the Prior Art

Layer composites, with paper, synthetic paper or polymeric films as carrier layer, for example, are frequently provided with an enhancement layer in order to improve and/or alter the properties of the layer composite. Through an enhancement layer it is possible to achieve improvements in, for example, the printability, by offset printing, for example, or the resistance of the recording material toward external influences.

In particular, heat-sensitive recording materials, which are layer composites, regularly include an enhancement layer—which may be a topcoat (also called protective layer or outer layer)—to improve the resistance of the heat-sensitive recording layer toward environmental influences.

Heat-sensitive recording materials have been known for many years and have enjoyed high popularity. One of the reasons for this popularity is that an advantage of using them is that the color-forming components are present in the recording material itself and it is therefore possible to use printers free from toner cartridges and ink cartridges. It is therefore no longer necessary to purchase or fill toner or ink cartridges. Accordingly, this innovative technology has established itself in particular in the printing of sales vouchers, receipts, dispatch labels, pay-and-display parking tickets, entry tickets and travel tickets, scientific and medical measurement protocols, barcode vouchers, price signs (e.g., in self-service fruit and vegetable scales), and numerous other kinds of labels.

Heat-sensitive recording materials are frequently used that are entirely unprinted—that is, white or virtually white—or are printed merely on the reverse. These unprinted, heat-sensitive recording materials are employed, for example, as voucher rolls in cash registers or travel ticket counters or in scientific and medical instruments, when, depending on the number of products or services purchased or on the number of data measurements collected, the length of the printed recording material varies.

As well as the unprinted heat-sensitive recording materials there are also printed heat-sensitive recording materi- In the context of the present text, a distinction is made between the printing of heat-sensitive recording materials (or layer composites) by the application of printing inks to the surface of the heat-sensitive recording material, by offset printing, for example, and the thermal printing of heat-sensitive recording materials by exposure to heat. Exposure to heat, for example by a thermal print head of a thermal printer, induces color formation via a chemical reaction of the dye precursor.

DE 35 44 758 C2 describes a paper coating material, which can be used to improve the properties of various types of paper, especially heat-sensitive recording papers. An improvement in the printability, plasticizer resistance, oil resistance, solvent resistance and water resistance, in particular, is described.

DE 693 02 703 T2 describes an air baggage label with increased tear strength and high printability.

US 2006/0111488 A1 describes the production of a neutral ethylene/acrylic acid copolymer dispersion and the use thereof for producing substrates for electrophotographic or digital offset printing. Besides an ethylene/acrylic acid copolymer and N,N-dialkylalkanamine, the dispersion may also comprise further additives. The substrates produced exhibit improved toner adhesion during printing.

US 2012/0100340 A1 describes flat substrates which at least on one side are coated, and have a surface roughness of less than 100 nm. Coating is accomplished with a coating composition which comprises customary ingredients such as pigments, binders, co-binders and additives. A feature of the substrates is that they can be printed with electrical components, such as transistors, chips, or circuits for example.

DE 694 01 145 T2 describes a heat-sensitive recording material provided with a protective layer.

WO 97/18091 A1 describes a heat-sensitive recording sheet, which includes a heat-sensitive recording layer covered by a pigment-containing protective layer. The effect of the protective layer is an improved barrier property with respect to fats, oils, alcohol and water.

DE 11 2011 100 779 T5 describes a thermal recording material comprising a heat-sensitive recording layer for color generation by heat, and a protective layer, which are applied in this order on a carrier, the protective layer comprising at least one acetoacetyl-modified polyvinyl alcohol which is crosslinked by a glyoxylate and an epichlorohydrin resin.

SUMMARY OF THE INVENTION

It has emerged that the paper and protective layers described in the prior art still do not have sufficiently high resistance and printability.

In the context of the present text, a distinction is made between the printing of heat-sensitive recording materials (or layer composites) by the application of printing inks to the surface of the heat-sensitive recording material, by offset printing, for example, and the thermal printing of heat-sensitive recording materials by exposure to heat. Exposure to heat, for example by a thermal print head of a thermal printer, induces color formation via a chemical reaction of the dye precursor.

It is an object of one aspect of the present invention to provide a coating composition for producing a layer composite that is able to achieve improved surface quality, especially water resistance, of the layer assembly and to produce a layer assembly that has very high printability, especially very high offset-printability.

The present object has been achieved by a coating composition for producing a layer composite, comprising
 a) a modified or unmodified polyvinyl alcohol,
 b) an alkylene/(meth)acrylic acid copolymer
 c) a crosslinker and
 d) one, two or more than two pigments.

It has surprisingly emerged that layer composites produced using a coating composition of the invention exhibit improved water resistance and improved offset-printability. Even after water storage of the layer composite produced, there was no observed detachment of the enhancement layer produced with the coating composition, and so the layer composite could be printed very well even by offset printing, without detachment of individual layers of the composite during the mechanical loading involved in printing. When the coating composition was used as an outer layer of a heat-sensitive recording material, the level of water resistance of the layer was such that, after water storage, there was no observable sticking-together of heat-sensitive recording materials which were stored together.

In particular, the combination of modified or unmodified polyvinyl alcohol and alkylene/(meth)acrylic acid copolymer in the presence of a crosslinker significantly improves the properties of layer composites produced using a coating composition of the invention. The mixture of modified or unmodified polyvinyl alcohol and alkylene/(meth)acrylic acid copolymer shows a synergistic effect, and the properties of the resultant layer composite cannot be obtained with the individual substances alone in this form.

In the context of one aspect of the present invention, a crosslinker is understood to be a monomer, oligomer or polymer that comprises reactive moieties and that enables the joining of linear or branched macromolecules to one another to form three-dimensional networks. Depending on their type, the crosslinkers react with the functional groups (—OH; —COOH etc.) of the substance to be crosslinked. At an optimum ratio between crosslinker and functional groups of the substance to be crosslinked, a three-dimensional network is formed in this process. With the use of crosslinkers, there is an increase in the hardness of the layer to be formed that is produced using the coating composition of the invention.

The term (meth)acrylic acid is understood in the context of the present invention to refer to an acrylic acid, a methacrylic acid, and a mixture of acrylic acid and methacrylic acid. An alkylene/(meth)acrylic acid copolymer is therefore a copolymer prepared by reaction of an alkylene with a) acrylic acid, b) methacrylic acid or c) a mixture of acrylic acid and methacrylic acid. The alkylene and (meth)acrylic acid units in the copolymer are usually distributed randomly, although alternating copolymers, block copolymers and graft copolymers can also be used; the random alkylene/(meth)acrylic acid copolymers are preferred in the invention.

Preferred in one aspect of the invention is a coating composition wherein the one pigment, the two pigments, or the more than two pigments comprise one, two or more than two organic pigments, one, two or more than two inorganic pigments, or a mixture of organic pigments and inorganic pigments.

Preferred in one aspect of the invention is a coating composition wherein at least one pigment, two pigments, or all the pigments are selected from the group consisting of aluminum silicate, aluminum oxide, aluminum hydroxide, barium sulfate, bentonite, boehmite, natural calcium carbonate, precipitated calcium carbonate, diatomaceous earth, urea-formaldehyde resin, natural kaolin, calcined kaolin, kaolinite or calcined kaolinite, kieselguhr, silica, preferably precipitated silica, magnesium silicate, magnesium carbonate, satin white, silicon oxide, talc, titanium oxide, alumina, activated alumina, and zinc oxide.

Preferred in one aspect of the invention is a coating composition wherein the coating composition comprises silica, preferably precipitated silica, as pigment.

Particularly preferred in one aspect of the invention is a coating composition wherein the coating composition comprises two or more pigments, where one pigment is silica, preferably precipitated silica, and the second pigment or the further pigments are selected from the group consisting of aluminum silicate, aluminum oxide, aluminum hydroxide, barium sulfate, bentonite, boehmite, natural calcium carbonate, precipitated calcium carbonate, diatomaceous earth, urea-formaldehyde resins, natural kaolin, calcined kaolin, kaolinite or calcined kaolinite, kieselguhr, magnesium silicate, magnesium carbonate, satin white, talc, titanium oxide, alumina, activated alumina, and zinc oxide.

Preferred in one aspect of the invention is a coating composition wherein the coating composition comprises two pigments, which are preferably kaolin and silica, preferably precipitated silica.

From in-house studies it has emerged that the use of silica as pigment in the layer composite produced using the coating composition of the invention improves the offset-printability still further, since the silica makes a contribution to regulating the water content in the recording material. During printing it is necessary for the coated recording material to have a certain water uptake capacity. Without a certain uptake of water, the layer composite to be printed is unable to take up the ink sufficiently well. In-house studies show the combination of kaolin and silica to have particularly good properties.

The use of a mixture of pigments wherein one pigment is a silica, preferably a precipitated silica, has proven particularly advantageous. The silica regulates the water uptake of the layer composite produced from the coating composition, while the further pigment or further pigments improve the technical properties of the layer composite—such as strength, scratch resistance, and optical properties.

Preferred in one aspect of the invention is a coating composition wherein the mass fraction of silica in the coating composition is 0.02 to 0.10, preferably 0.05 to 0.07, very preferably 0.01 to 0.05, based on the dry mass of the coating composition.

In-house studies have shown that the water uptake capacity of the layer composite produced from the coating composition is ideal for offset-printability when the silica content is within the ranges specified above.

Preferred in one aspect of the invention is a coating composition wherein the silica has a mean particle size (d50) in the range from 5 to 18 µm, preferably a particle size in the range from 8 to 15 µm, very preferably in the range from 10 to 14 μm. The mean particle size is determined by particle size analysis by the laser diffraction method according to DIN/ISO 13320-1 [1999].

In an alternative embodiment, it is preferred in one aspect of the invention if the silica has a mean particle size (d50) in the range from 4 to 18 μm, preferably a particle size in the range from 5 to 12 μm, very preferably in the range from 6 to 10 μm. The mean particle size is determined by particle size analysis by the laser diffraction method according to DIN/ISO 13320-1 [1999].

A scattered laser light spectrometer operates on the principle of the statistical scattering of laser light in accordance with DIN/ISO 13320-1 [1999] in the measuring range from 0.01 μm to 3000 μm. There is therefore no need for reconfiguration of the instrument. For the automated measurement, the particulate sample is placed into a circulation unit for wet measurement. An integrated ultrasound probe prevents the particles crosslinking and removes the need for external sample preparation. In the interaction of laser light with particles, scattered light patterns characteristic for the particle size are produced by diffraction, refraction, reflection and absorption. Mie theory allows the particle size distribution to be deduced from these scattered light patterns.

In laser diffraction, particle size distributions are determined by measuring the angle dependence of the intensity of scattered light from a laser beam passing through a dispersed silica particle sample. Here, large particles scatter light at small angles relative to the laser beam, whereas small particles lead to large scattering angles. The data for the angle-dependent scattered light intensity are analyzed and used as a basis for computing the size of the particles which are responsible for the diffraction pattern. Mie theory is utilized in this case. The particle size is reported as the diameter of the sphere having the same volume. The scattered light theory developed by Mie in 1908 is based on the supposition that the scattered light pattern generated by a particle displays characteristic features which, given knowledge of the optical parameters, enable an unambiguous assignment of size. Fraunhofer analysis is available for particles significantly larger than 10-20 μm for simplicity, because only light diffraction is analyzed and hence the correct optical parameters are not needed.

In-house studies have shown that silicas whose mean particle size lies within the ranges stated above have a particularly strong influence on the printability of the layer composite produced using the coating composition of the invention.

Preferred in one aspect of the invention is a coating composition wherein the silica has a specific surface area ($N_2$) in the range from 100 to 300 $m^2/g$, preferably in the range from 150 to 250 $m^2/g$, very preferably in the range from 170 to 210 $m^2/g$. The specific surface area is determined according to ISO 9277.

Preferred in one aspect of the invention is a coating composition wherein the silica has a di(2-ethylhexyl)adipate absorption (DOA absorption) in the range from 150 to 350 ml/100 g, preferably in the range from 200 to 300 ml/100 g, very preferably in the range from 220 to 260 ml/100 g. The DOA absorption is determined in a method based on ISO 19246: 2016-07.

ISO 19246: 2016-07 specifies a general method for determining the liquid absorption capacity of a pigment, presently silica, and hence the oil absorption of precipitated silica, using di(2-ethylhexyl)adipate (DOA, CAS 103-23-1, adipic ester of 2-ethylhexanol; dioctyl adipate). The DOA absorption number is determined using an absorptometer. The DOA absorption number provides an indication of the cavity volume formed by the aggregates and agglomerates of the pigments. An absorptometer is an apparatus with a torque measuring system (dynamometer) for precise and reproducible measurement of the DOA absorption number of pigments. The measuring principle is based on the change in consistency of the powder on absorption of DOA; this change in consistency is captured metrologically. For this purpose, the absorptometer has essentially two components: a drive unit with torque measuring system, and a recording compounder installed thereon and equipped with special-purpose blades. The torque is measured and plotted throughout the special compounding operation. With the assistance of an automatic precision metering pump, the DOA is gradually titrated into the silica powder in the recording compounder. The DOA liquid is absorbed by the silica structure and the powder undergoes agglomeration. This increases the torque required for the compounding operation, which ultimately reaches a maximum. The DOA absorption number is reported, with reference to ISO 19246: 2016-07, in ml (of DOA absorbed) per 100 g of sample material.

Preferred in one aspect of the invention is a coating composition wherein the coating composition contains no further pigments.

Preferred in one aspect of the invention is a coating composition wherein the alkylene/(meth)acrylic acid copolymer is an ethylene/(meth)acrylic acid copolymer, propylene/(meth)acrylic acid copolymer, a butylene/(meth)acrylic acid copolymer or an isobutylene/(meth)acrylic acid copolymer, preferably an ethylene/(meth)acrylic acid copolymer; more preferably the alkylene/(meth)acrylic acid copolymer is an ethylene/acrylic acid copolymer.

The preparation of ethylene/acrylic acid copolymers is described for example in DE 32 07 744 A1.

Preferred in one aspect of the invention is a coating composition wherein the alkylene/(meth)acrylic acid copolymer is of linear or branched construction.

Preferred in one aspect of the invention is a coating composition wherein the alkylene/(meth)acrylic acid copolymer, preferably an ethylene/acrylic acid copolymer, has a melting point in the range from 80 to 140° C., preferably in the range from 95 to 125° C., very preferably in the range from 105 to 115° C.

In-house studies have shown that the layer composites produced using the coating composition of the invention and comprising an ethylene/acrylic acid copolymer as well as the crosslinker exhibit particularly good water resistance.

Preferred in one aspect of the invention is a coating composition wherein the crosslinker has at least one functional group selected from the group consisting of an aldehyde group, amine group, carboxyl group, carboxylate group, and hydrazide group.

Particularly preferred in one aspect of the invention is a coating composition wherein the crosslinker is selected from the group consisting of polyamidoamine/epichlorohydrin resin, epiochlorohydrin resin, polyamine, epoxy resin, sodium glyoxylate, calcium glyoxylate, sodium/calcium glyoxylate, 1,3-bis(aminomethyl)cyclohexane, methylolmelamine, zirconium(IV) oxide, zirconyl chloride, metal salts, boric acid, dialdehyde, formaldehyde oligomers, adipic dihydrazide, dimethylurea, melamine-formaldehyde, methaxylenediamine, and mixtures thereof. One embodiment of the invention uses a mixture of two or more crosslinkers, preferably the above-stated crosslinkers.

Preferred in one aspect of the invention is a coating composition wherein the coating composition comprises a modified polyvinyl alcohol, preferably an acetoacetyl-modified polyvinyl alcohol, carboxyl group-modified polyvinyl alcohol, silanol group-modified polyvinyl alcohol or diacetone-modified polyvinyl alcohol, very preferably an acetoacetyl-modified polyvinyl alcohol.

In-house studies have shown that the layer composites produced using the coating composition of the invention and comprising an ethylene/acrylic acid copolymer and an acetoacetyl-modified polyvinyl alcohol as well as the crosslinker exhibit outstanding water resistance.

In one particularly preferred embodiment of a coating composition of the invention, the coating composition comprises two different acetoacetyl-modified polyvinyl alcohols, where preferably the viscosity at 20° C. of the first acetoacetyl-modified polyvinyl alcohol is in the range from 10 to 16 mPa s, preferably in the range from 11.5 to 15 mPa s, and the viscosity at 20° C. of the second acetoacetyl-modified polyvinyl alcohol is in the range from 35 to 55 mPa s, preferably in the range from 43 to 59 mPa s. The viscosity is determined at 20° C. in an aqueous solution with a mass fraction of 0.04 of acetoacetyl-modified polyvinyl alcohol.

The viscosity of polymers is a measure of the molar mass of the polymer. Preferred, therefore, are coating compositions of the invention which comprise two different acetoacetyl-modified polyvinyl alcohols having different molar masses, or one acetoacetyl-modified polyvinyl alcohol having a bimodal molar mass distribution.

Preferred in one aspect of the invention is a coating composition wherein the coating composition comprises a first acetoacetyl-modified polyvinyl alcohol having a degree of saponification in the range from 97 to 99 mol %, and/or comprises a second acetoacetyl-modified polyvinyl alcohol having a degree of saponification in the range from 95 to 97 mol %.

Preferred in the invention is a coating composition wherein the coating composition comprises
  a) 0.30 to 0.70, preferably 0.40 to 0.60, very preferably 0.45 to 0.55 mass fractions of modified or unmodified polyvinyl alcohols,
  b) 0.05 to 0.10, preferably 0.01 to 0.07, very preferably 0.02 to 0.05 mass fractions of alkylene/(meth)acrylic acid copolymer,
  c) 0.005 to 0.07, preferably 0.01 to 0.05, very preferably 0.01 to 0.03 mass fractions of crosslinker
  and/or
  d) 0.20 to 0.50, preferably 0.25 to 0.45, very preferably 0.30 to 0.40 mass fractions of one, two or the more than two pigments.

Particularly preferred in the invention is a coating composition comprising
  a) an acetoacetyl-modified polyvinyl alcohol,
  b) an ethylene/acrylic acid copolymer, preferably in the above-stated melting point ranges,
  c) a crosslinker and
  d) kaolin and silica as pigments,
where the silica has the above-stated mean particle size ranges.

The coating composition of the invention can be used as a barrier coat or topcoat. It is preferably used as a topcoat for producing an outer layer.

The term "barrier coat" in the context of the present invention therefore refers to a coating (a "coat" in the jargon) that is applied to a carrier layer (on one or both sides) and which endows the carrier layer with barrier properties in that the barrier coat prevents the passage through the carrier layer of a mobile substance, especially fat and/or oil and/or moisture. The application of this coating, namely of the barrier coat, is termed "coating", and the coating to be applied is termed a "coating color". The application of a barrier coat to the carrier layer produces a layer composite made up of at least two layers. This layer composite may be provided with the enhancement layer of the invention, produced from the coating composition of the invention.

Layer composites, for example with paper, synthetic paper or polymeric films as their carrier layer, are frequently provided with an enhancement layer in order to improve and/or modify the properties of the layer composite. Through an enhancement layer it is possible to improve, for example, the printability, by offset printing, for example, or the resistance of the recording material with respect to external influences.

Where the carrier layer in the layer composite of the invention consists of paper, and at least one barrier coat has been applied, this layer composite is also referred to as barrier paper. The term "barrier paper" in the context of the present invention refers to a specialty paper and the barrier paper, by virtue of its nature and/or construction, for example, is equipped with a barrier (i.e., a hindrance) to the unwanted passage of certain substances such as, for example, mobile (e.g., pore-mobile and/or mobile as a consequence of capillary forces), hydrophilic and/or hydrophobic, and possibly also amphiphilic, substances. The term "mobile substances" refers preferably to substances which are customarily present in foods, such as fat and/or oil and/or moisture, for example. In particular, therefore, the term "barrier paper" refers to highly greaseproof and/or water-/moisture-proof barrier papers for food applications. A fundamental distinction here among specialty papers is drawn by the skilled person between "uncoated" papers (in the context of the present invention, for example, the paper carrier layer, for example) and "coated" papers (in the context of the present invention, for example, the barrier paper comprising at least one "barrier coat").

Foods sold loose, such as sausage, cheese, or bakery products, are conventionally handed to customers in packaging, for reasons of hygiene or freshness retention. There are stringent requirements on the packaging in this case, especially for fatty foods. Where conventional, paper-based packaging is used, with fatty foods, the fat from the food may penetrate the packaging material. This can lead to the packaging material softening and tearing, or to contamination of other items with the fat if they come into contact with the packaging.

The coating composition of the invention allows the offset-printability of food packaging, and also water resistance, to be increased significantly. The coating composition of the invention may be applied in order to generate a barrier layer or may be used in order to enhance a carrier layer—of paper, for example—that has already been provided with a barrier layer. In both embodiments, the improved water resistance and the improved printability are fully manifested, and in each case a layer composite is formed which has at least one layer made from the coating composition of the invention.

It is preferred in the invention if the coating composition of the invention comprises no N,N-dialkylalkanolamines.

A further aspect of the present invention relates to a layer composite comprising a carrier layer and an enhancement layer, wherein the enhancement layer has been produced from a coating composition of the invention.

In one embodiment of the layer composite of the invention, the carrier layer is covered wholly or partly with an enhancement layer.

Preferred in one aspect of the invention is a layer composite wherein the carrier layer is a paper, synthetic paper or a polymeric film.

Preferred in one aspect of the invention is a layer composite wherein the layer composite comprises a heat-sensitive recording layer disposed between the carrier layer and the coating composition, where the heat-sensitive recording layer comprises a dye precursor and a color developer and the color developer on exposure to heat is able to induce formation of color in the dye precursor.

Preferred in one aspect of the invention is a layer composite wherein the heat-sensitive recording layer comprises a binder, preferably a crosslinked or noncrosslinked binder, selected from the group consisting of polyvinyl alcohol, acetoacetyl-modified polyvinyl alcohol, carboxyl group-modified polyvinyl alcohol, ethylene-vinyl alcohol copolymer, a combination of polyvinyl alcohol and ethylene-vinyl alcohol copolymer, silanol group-modified polyvinyl alcohol, diacetone-modified polyvinyl alcohol, acrylate copolymer, and film-forming acrylic copolymers. Provided as binder with particular preference is an acetoacetyl-modified polyvinyl alcohol.

In-house studies have shown that these binders are especially suitable for use in the heat-sensitive recording layer.

Preferred in one aspect of the invention is a layer composite wherein the heat-sensitive recording layer comprises an acetoacetyl-modified polyvinyl alcohol as well as a further binder.

During the formation of the enhancement layer after the application of the coating composition of the invention, the crosslinker crosslinks the modified or unmodified polyvinyl alcohol and/or the alkylene/(meth)acrylic acid copolymer with one another, to result in a crosslinked polymer. This crosslinking may occur a) between two different polyvinyl alcohol molecules or between two different sites of a polyvinyl alcohol molecule, b) between two different alkylene/(meth)acrylic acid copolymer molecules or between two different sites of an alkylene/(meth)acrylic acid copolymer molecule, or c) between a polyvinyl alcohol molecule and an alkylene/(meth)acrylic acid copolymer molecule. The result is a permanent polymer network.

In in-house studies it has emerged that the use of an acetoacetyl-modified polyvinyl alcohol in the heat-sensitive recording layer makes it possible to improve significantly the adhesion between the heat-sensitive recording layer and the enhancement layer. Improved adhesion between the heat-sensitive recording layer and the enhancement layer has the effect, moreover, of even further improvement in the offset-printability, since it is possible to prevent detachment of the enhancement layer or of parts of the enhancement layer.

Particularly preferred in one aspect of the invention is a layer composite in which an acetoacetyl-modified polyvinyl alcohol is present as binder both in the enhancement layer and in the heat-sensitive recording layer.

Particularly preferred in one aspect of the invention, furthermore, is a layer composite in which an acetoacetyl-modified polyvinyl alcohol is present as binder both in the enhancement layer and in the barrier layer.

Preferred in one aspect of the invention is a layer composite wherein the dye precursor is selected from derivatives of compounds from the group consisting of fluoran, phthalide, lactam, triphenylmethane, phenothiazine, and spiropyran.

Preferred in one aspect of the invention is a layer composite wherein the dye precursor is selected from the group consisting of 3-diethylamino-6-methyl-7-anilinofluoran, 3-diethylamino-6-methyl-7-(3'-methylphenylamino)fluoran (6'-(diethylamino)-3'-methyl-2'-(m-tolylamino)-3H-spiro [isobenzofuran-1,9'-xanthen]-3-one; ODB-7), 3-di-n-pentyl-amino-6-methyl-7-anilinofluoran, 3-(diethylamino)-6-methyl-7-(3-methylphenylamino)fluoran, 3-di-n-butylamino-7-(2-chloroanilino)fluoran, 3-diethylamino-7-(2-chloroanilino)fluoran, 3-diethylamino-6-methyl-7-xylidinofluoran, 3-diethylamino-7-(2-carbomethoxyphenylamino)fluoran, 3-pyrrolidino-6-methyl-7-anilinofluoran, 3-pyrrolidino-6-methyl-7-(4-n-butyl-phenylamino)fluoran, 3-piperidino-6-methyl-7-anilinofluoran, 3-N-n-dibutylamine-6-methyl-7-anilinofluoran (ODB-2), 3-(N-methyl-N-cyclohexyl)amino-6-methyl-7-anilinofluoran, 3-(N-methyl-N-propyl)amino-6-methyl-7-anilinofluoran, 3-(N-methyl-N-tetrahydrofurfuryl)amino-6-methyl-7-anilinofluoran), 3-(N-ethyl-N-isoamyl)amino-6-methyl-7-anilinofluoran, 3-(N-ethyl-N-tolyl)amino-6-methyl-7-anilinofluoran, 3-(N-ethyl-N-tetrahydrofuryl)amino-6-methyl-7-anilinofluoran, 3-(N-ethyl-N-isopentylamino)-6-methyl-7-anilinofluoran, 3-(N-ethyl-4-toluidino)-6-methyl-7-(4-toluidino)fluoran, and 3-(N-cyclopentyl-N-ethyl)amino-6-methyl-7-anilinofluoran.

Preferred in one aspect of the invention is a layer composite wherein the dye precursor is selected from the group consisting of 3-N-di-n-butylamine-6-methyl-7-anilinofluoran (ODB-2), and 3-(N-ethyl-N-isopentylamino)-6-methyl-7-anilinofluoran.

Preferred in one aspect of the invention is a layer composite wherein the color developer is selected from the group consisting of 4,4'-dihydroxydiphenyl sulfone (CAS 80-09-1; bisphenol S), 4-[2-(4-hydroxyphenyl)propan-2-yl] phenol (bisphenol A), N-(4-methylphenylsulfonyl)-N'-(3-(4-methylphenylsulfonyloxy)phenyl)urea (Pergafast 201), 4-hydroxy-4'-isopropoxydiphenyl sulfone (D8) and N-{2-[(phenylcarbamoyl)amino]phenyl}benzenesulfonamide (NKK), 4,4'-isopropylidene-di-o-cresol (CAS 79-97-0; bisphenol C), 2,4'-dihydroxydiphenyl sulfone, 2,4'-sulfonyldiphenol (CAS 5397-34-2; 2,4'-bisphenol S), bis[4-(2-hydroxyethoxy)phenyl] sulfone, 2,2'-[sulfonylbis(4,1-phenyleneoxy)]bisethanol (CAS 27205-03-4), diphenyl sulfone (CAS 127-63-9, DPS).

Preferred in one aspect of the invention is a layer composite wherein the color developer is one color developer or a mixture of two or more color developers.

Preferred in one aspect of the invention is a layer composite wherein the heat-sensitive recording layer comprises a sensitizer, preferably a sensitizer selected from the group consisting of fatty acid salts, fatty acid esters and fatty acid amides (e.g., zinc stearate, stearamide, palmitamide, oleamide, lauramide, ethylene- and methylenebisstearamide, methylolstearamide), naphthalene derivates, biphenyl derivates, phthalates, and terephthalates.

Preferred in one aspect of the invention is a layer composite wherein the sensitizer is selected from the group consisting of 1,2-bis(3-methylphenoxy)ethane, 1,2-diphenoxyethane, 1,2-di(m-methylphenoxy)ethane, 2-(2H-benzotriazol-2-yl)-p-cresol, 2,2'-bis(4-methoxyphenoxy)diethyl ether, 4,4'-diallyloxydiphenyl sulfone, 4-acetylacetophenone, 4-benzyl biphenyl, acetoacetanilides, benzyl 2-naphthyl ether, benzyl naphthyl ether, benzyl 4-(benzyloxy) benzoate, benzylparaben, bis(4-chlorobenzyl) oxalate ester, bis(4-methoxyphenyl) ether, dibenzyl oxalate, dibenzyl terephthalate, dimethyl terephthalate, dimethyl sulfone, diphenyl adipate, diphenyl sulfone, ethylenebisstearamide, fatty acid anilides, m-terpenyl, N-hydroxymethylstearamide, N-methylolstearamide, N-stearylurea, N-stearylstearamide, p-benzylbiphenyl, phenyl benzenesulfonate ester, salicylanilide, stearamide, and α,α'-diphenoxyxylene, where benzyl-2-naphthyl ether, benzyl naphthyl ether, diphenyl sulfone, 1,2-di(m-methylphenoxy)ethane and 1,2-diphenoxyethane are particularly preferred.

Especially preferred is a layer composite comprising a carrier layer and an enhancement layer, where the enhancement layer has been produced from a coating composition of the invention, where the layer composite comprises a heat-sensitive recording layer disposed between the carrier layer and the coating composition, where the heat-sensitive recording layer comprises a dye precursor and a color developer, and the color developer on exposure to heat is able to induce formation of color in the dye precursor, where an acetoacetyl-modified polyvinyl alcohol is present as binder both in the enhancement layer and in the heat-sensitive recording layer.

It is especially preferred in this case if the enhancement layer is the outer layer.

Particularly preferred in the invention is a layer composite wherein the enhancement layer is an outer layer and this outer layer has a Print-Surf roughness of greater than 0.6 μm, preferably greater than 1 μm, more preferably greater than 1.4 μm. The Print-Surf roughness is determined according to DIN ISO 8791-4:2008-05.

It is preferred in the invention if the enhancement layer is an outer layer and has an ISO 5627 Bekk smoothness in the range from 100 to 1200 s, preferably 300 to 900 s, more preferably 550 to 850 s. Departing from ISO 5627, the Bekk smoothness is in this case not determined on both sides of the paper, but rather only on the enhancement layer of the layer composite.

In-house studies have shown that the printability of the layer composite is particularly good if the above-described Print-Surf roughness and/or the Bekk smoothness are established.

It is preferred in the invention if the layer composite has an ISO 5627 Bekk smoothness in the range from 100 to 1200 s, preferably 300 to 900 s, more preferably 550 to 850 s.

A further aspect of the present invention relates to the use of a layer composite of the invention as entry ticket, air, rail, boat or bus ticket, gaming ticket, car park ticket, label, sales voucher, bank statement, self-adhesive label, medical diagram paper, fax paper, security paper, or barcode label.

A further aspect of the present invention relates to a use of a mixture of ethylene/acrylic acid copolymer and acetoacetyl-modified polyvinyl alcohol in a layer of a layer composite.

A preferred inventive use is that wherein the layer is an outer layer.

Preferred in the invention is a use wherein the layer composite is a heat-sensitive recording material.

A further aspect of the present invention relates to a method for producing a layer composite, preferably for producing a layer composite of the invention, at least comprising the following method steps:
i) providing or preparing a coating composition comprising
   a) a modified or unmodified polyvinyl alcohol,
   b) an alkylene/(meth)acrylic acid copolymer,
   c) a crosslinker, and
   d) one, two or more than two pigments,
   where the coating composition is preferably a coating composition of the invention;
ii) applying the coating composition provided or produced from method step i) to a substrate;
iii) drying the coating composition applied in method step ii), to form an enhancement layer.

Preferred in the invention is a method additionally comprising the following method steps:
a) providing or producing a carrier substrate;
b) providing or preparing a coating composition comprising a dye precursor and a color developer;
c) applying the coating composition prepared or provided in method step b);
d) drying the coating composition applied in method step c), to form a heat-sensitive recording layer,
where steps a) to d) are carried out before step i), and the carrier substrate produced in method step d) and coated with a heat-sensitive recording layer serves as the substrate in method step ii), where the coating composition prepared or provided in method step i) is applied in method step ii) preferably to the heat-sensitive recording layer.

Preferred in the invention is a method wherein the carrier substrate produced or provided in method step a) is a paper, synthetic paper or a polymeric film and preferably is provided with a precoat.

In the context of the present invention, preferably two or more of the aspects designated above as preferred are realized at the same time; especially preferred are the combinations of such aspects and of the corresponding features that are evident from the appended claims.

The inventive and comparative examples which follow further clarify the invention:

In papermaking, a distinction is made between three grades for the dry matter content of paper and pulp: "BD" (bone-dry), "AD" (air-dry) and "OD" (oven-dry). The figure is reported in each case as "% BD", "% AD" and "% OD". "BD" here represents a paper or pulp with 0% water content. For "AD" here, a "normal" (needed fundamentally for the paper) moisture content is employed as the basis for calculation. In the case of chemical and mechanical pulps, the calculation material is based in general on 90:100—that is, 90 parts of pulp, 10 parts of water.

The condition of paper or pulp after drying under specified, defined conditions is referred to as "OD".

DETAILED DESCRIPTION OF THE PRESENTLY PREFERRED EMBODIMENTS

Inventive Example 1

Figure 1:
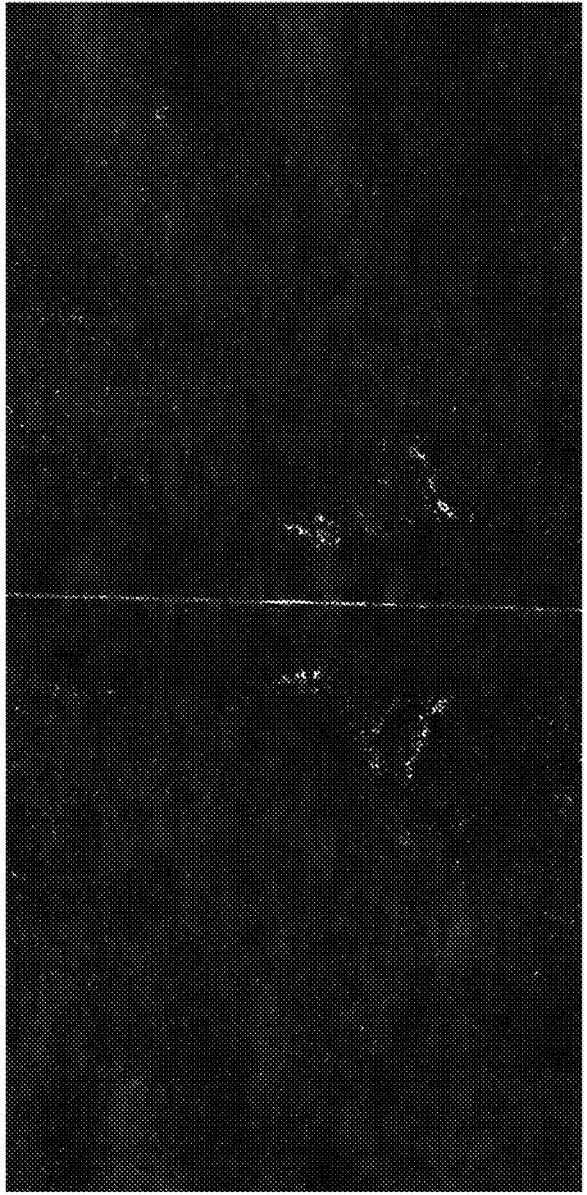
FIG. 1 is an image of a square of heat sensitive recording material.

A coating composition according to one aspect of the invention is prepared. The coating composition is prepared by mixing the constituents in Table 1.

TABLE 1

| Component | Constituent | Mass fractions w(x) (BD) |
|---|---|---|
| Pigment | Kaolin (Trade name: ASP 179) | 0.30 to 0.40 |
| Pigment | Silica (Trade name: Sipernat 22S) | 0.020 to 0.040 |
| Polyvinyl alcohol | Acetoacetyl-modified PVA (Trade name: Gohsenx Z-410) | 0.05 to 0.15 |
| Polyvinyl alcohol | Acetoacetyl-modified PVA (Trade name: Gohsenx Z-200) | 0.20 to 0.50 |
| Additive | Zinc stearate (Trade name: Hidorin | 0.05 to 0.07 |

TABLE 1-continued

| Component | Constituent | Mass fractions w(x) (BD) |
|---|---|---|
| | Z-7-30) | |
| Crosslinker | Polyamidoamine epichlorohydrin resin (Trade name: Giluton 20XP) | 0.015 to 0.035 |
| Alkylene/ (meth)acrylic acid copolymer | Ethylene acrylic acid copolymer (Trade name: Aquacer 1061) | 0.015 to 0.040 |
| Crosslinkers | Sodium/calcium glyoxylate (Trade name: SPM-01/SPM-02) | 0.005 to 0.020 |

A coating composition according to one aspect of the invention is obtained, and can be used for producing layer composites (e.g., heat-sensitive recording materials).

Inventive Example 2

The sheetlike substrate used is a carrier paper having a mass per unit area of 64 g/m², produced on a fourdrinier paper machine from bleached and ground hardwood and softwood pulps, with addition, based on the overall solids content (BD) of the pulp supplied to the paper machine, of 0.008 mass fraction of resin size as a stock sizing, and also of other customary adjuvants.

Applied to the front side is an interlayer comprising calcined kaolin as pigment, styrene-butadiene latex as binder and, in addition to other auxiliaries, starch as cobinder, this interlayer being applied with a mass per unit area of 9 g/m², using a coating knife.

Applied atop this pigmented interlayer, using a roller blade coater, is a heat-sensitive recording layer having a mass per unit area of 2.5 g/m². The aqueous coating slip used for this purpose contains the following components, according to the formulation reproduced in Table 2:

TABLE 2

Amounts in mass fractions w(x) (BD), based on the total mass of the heat-sensitive recording layer

| Dye precursor | 3-Dibutylamino-6-methyl-7-anilinofluoran (ODB-2) | 0.10 to 0.20 |
|---|---|---|
| Color developer | N-(p-Toluenesulfonyl)-N'-3-(p-toluenesulfonyloxyphenyl)urea (Pergafast ® 201 (BASF)) | 0.20 to 0.30 |
| Sensitizer | Benzyl 2-naphthyl ether (BNE) | 0.20 to 0.30 |
| Binder | Ethylene-vinyl alcohol copolymer (RS 2117) | 0.10 to 0.20 |
| Binder | Acetoacetyl-modified PVA (Trade name: Gohsenx Z-200) | 0.010 to 0.025 |
| Sensitizer | Methylolamide dispersion (Hidorin D757) | 0.015 to 0.030 |
| Additive | Paraffin wax (Hidorin J 157) | 0.010 to 0.025 |
| Additive | Zinc stearate (Hidorin SZ 40) | 0.010 to 0.025 |
| Optical brightener | Hexasodium 2,2'-{vinylenebis[(3-sulfonato-4,1- phenylene)imino[6-morpholino-1,3,5-triazine-4,2-diyl]imino]}bis(benzene-1,4-disulfonate; CAS No. 52301-70-9; Ciba Speciality Chemicals Inc.; Basel; CH) | 0.003 to 0.007 |

After the heat-sensitive recording layer has been applied, it is dried and calendered.

Applied atop this dried, heat-sensitive recording layer, using a roller blade coater, is a coating composition of the invention, prepared according to inventive example 1, with a mass per unit area of 2 g/m².

A heat-sensitive recording material is obtained which is a layer composite.

The heat-sensitive recording material produced has extremely good offset-printability and extremely good water resistance.

Comparative Example 1

Comparative example 1 is carried out in analogy to inventive example 2, but without the addition of silica as pigment and without the addition of the ethylene-acrylic acid copolymer. Instead the amount of kaolin and acetoacetyl-modified PVA (Trade name: Gohsenx™ Z-200) is adapted accordingly.

Determination of Water Resistance:

Squares each measuring 5 cm times 10 cm were cut out from the heat-sensitive recording material under test, from inventive example 2 and comparative example 1.

The squares cut out were each folded in the middle, so that two 5 cm times 5 cm regions of the coating side were lying one against the other. The fold was opened and the coating side was wetted with one drop of water. The fold was then closed again and pressed together. The folded and wetted squares were placed between two glass plates, and a filter paper was placed between the squares. The glass plates were weighted down and left to stand for 24 hours. The squares were then separated, carefully unfolded, and dried in an oven at 90° C. for one hour. The squares were subsequently taken from the oven and weighted down.

The square produced from the heat-sensitive recording material produced according to inventive example 2 could be unfolded without detachment of the surface, the surface having a uniform black coloration. An image of the square is shown in FIG. 1.

Figure 2:
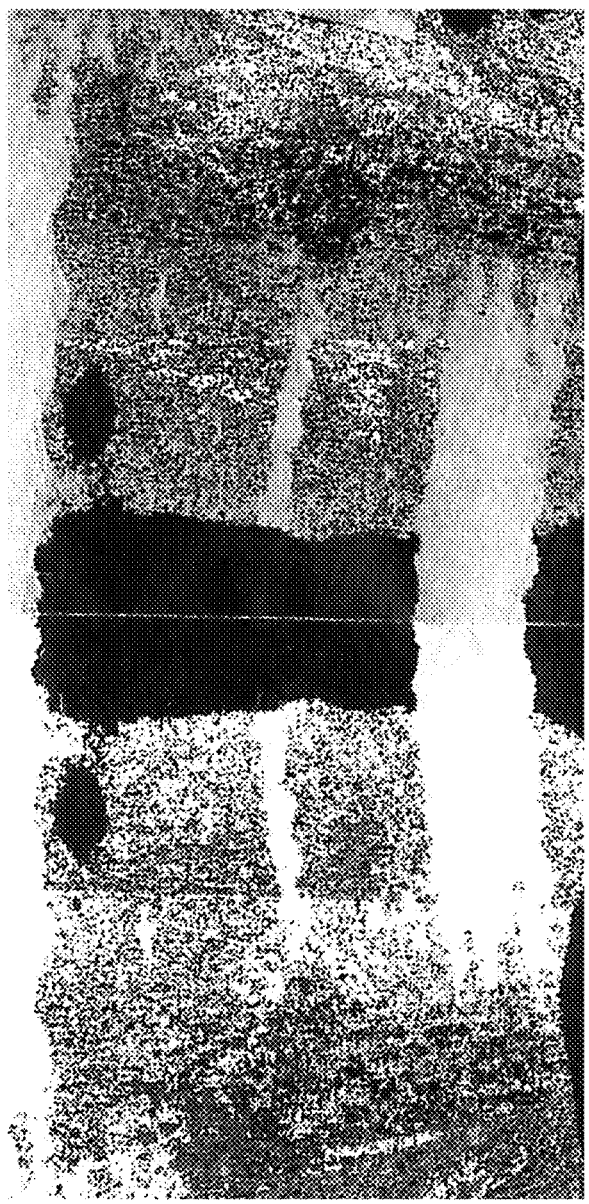
FIG. 2 is an image of a square of heat sensitive recording material.

The square produced from the heat-sensitive recording material produced according to comparative example 1 exhibited detachment of the surface on unfolding, and the surface did not have a uniform black coloration. An image of the square is shown in FIG. 2. It can be assumed that during offset printing there is detachment of the surface and that on storage under damp conditions it is not possible to ensure thermal printability.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A layer composite comprising:
    a carrier layer; and
    an enhancement layer, produced from a coating composition, comprising:
        an acetoacetyl-modified polyvinyl alcohol;
        an alkylene/(meth)acrylic acid copolymer;
        wherein the alkylene (methyl) acrylic acid polymer is ethylene/acrylacid copolymer;

a crosslinker; and
at least one pigment:,
wherein the layer composite comprises:
a heat-sensitive recording layer which is disposed between the carrier layer and the coating composition and which comprises a dye precursor and a color developer, and the color developer on exposure to heat is able to induce color formation in the dye precursor,
wherein the heat-sensitive recording layer comprises an acetoacetyl-modified polyvinyl alcohol and
wherein at least one pigment in the coating composition comprises two pigments, which are kaolin, in a mass fraction of 0.3 to 0.4 and precipitated silica, in a mass fraction of 0.02 to 0.04, which has a mean particle size in the range from 6 to 10 μm, determined by particle size analysis by a laser diffraction method.

2. The coating composition as claimed in claim 1, wherein during the formation of the enhancement layer after the application of the coating composition, the crosslinker has crosslinked the acetoacetyl-modified polyvinyl alcohol and/or the alkylene/(meth)acrylic acid copolymer with one another, to result in a crosslinked polymer.

* * * * *